(No Model.)
G. TERLINDEN.
HOSE COUPLING.
No. 508,448. Patented Nov. 14, 1893.
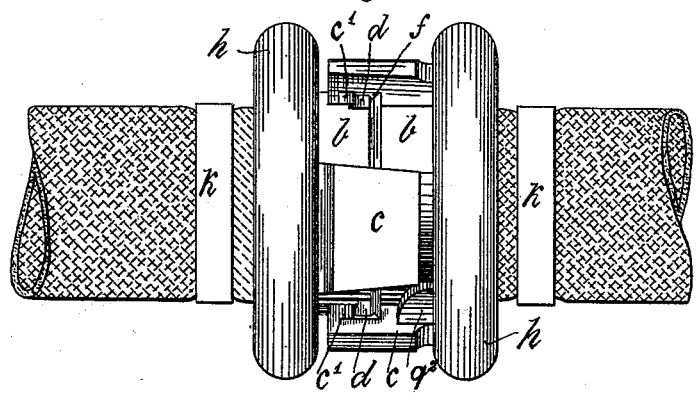
Fig: 1.
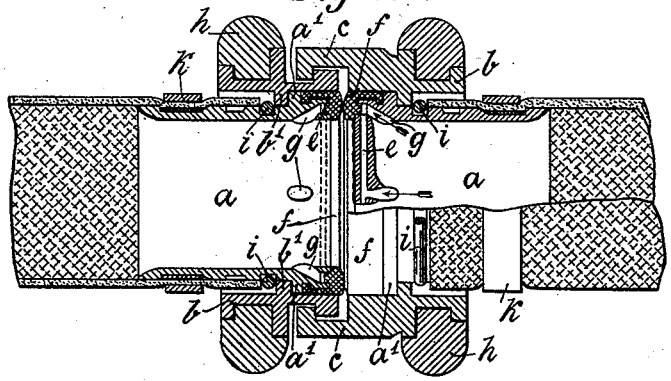
Fig: 2.
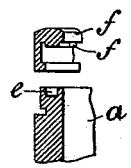
Fig: 4.
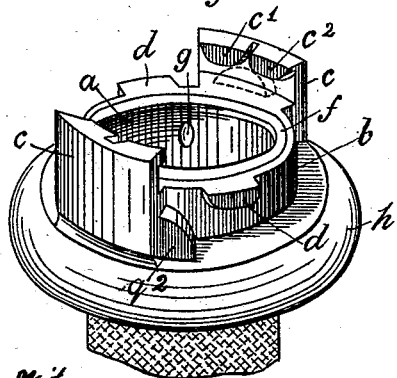
Fig: 3.
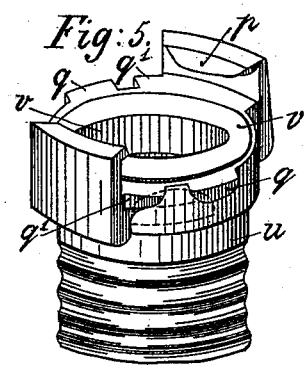
Fig: 5.
Witnesses:
E. H. Sturtevant
A. M. Linton
Inventor:—
Gerhard Terlinden
by
Richards &
attorneys.
THE NATIONAL LITHOGRAPHING COMPANY,
WASHINGTON, D. C.

UNITED STATES PATENT OFFICE.

GERHARD TERLINDEN, OF OBERHAUSEN, GERMANY.

HOSE-COUPLING.

SPECIFICATION forming part of Letters Patent No. 508,448, dated November 14, 1893.

Application filed January 4, 1893. Serial No. 457,275. (No model.)

*To all whom it may concern:*

Be it known that I, GERHARD TERLINDEN, manufacturer, of Oberhausen, Rhenish Prussia, in the Empire of Germany, have invented a new and useful Improved Hose-Coupling, of which the following is a full, clear, and exact description.

In the accompanying drawings, Figure 1 is an elevation of the improved hose-coupling with loose coupling-rings which are represented in the position in which they are engaged. Fig. 2 is a longitudinal section of the said hose-coupling with a partial view of one (the right hand) socket of the hose, in which, by the breaking off of the metal and india-rubber at the front surface, the annular tightening chamber behind the india-rubber ring is rendered visible. Fig. 3 is a perspective view of one half of the coupling shown in Fig. 1. Fig. 4 is a detail section through the front edge of a socket of the hose (according to Figs. 1, 2, 3) above which a piece of the tightening ring is also represented in sections. Fig. 5 (to which the section Fig. 6 belongs) is a perspective view of a socket of the hose which is directly connected with the coupling-lugs, thus obtaining a modified or simplified construction of the improved new hose-coupling.

In order to explain the principle of the improved coupling device, I refer in the first instance to the simplified construction of Fig. 5. The fluted or corrugated coupling-socket $u$ over which one part of the hose is drawn, is provided, in proximity to the front surface covered with an india-rubber ring $v$, with the opposite lugs $q$ by the side of which are arranged the supplementary lugs $q'$. Between these lugs $q$, $q'$ provided with rounded or arched under surfaces, are thus produced notches which effect, in the manner hereinafter described, the fixing of the coupling in the locked position. By the sides of the lugs $q$, $q'$ are also arranged opposite to each other the hooked arms $p$ in such a manner that they project beyond the front joint surface, and the inwardly turned arched hooks are at the same distance from the axis of the socket or tube as the lugs $q$, $q'$. It is obvious that if, against this socket, is placed a second similar socket with alternately arranged lugs $q$, $q'$, and hook-shaped lugs $p$, the parts which couple are, in the first instance, brought to such a position that they are ready for mutual engagement, the hooks being placed in openings by the side of the lugs, and the engaging edges of the latter being somewhat behind the plane of the engaging edges of the hooks. If then the halves of the coupling or the sockets fitting together are turned in opposite directions, the lugs and hooks come into engagement so as to lock the parts of the coupling together. In such partial turning of the sockets, by reason of the combined action of the surfaces on the coupling parts ($q$, $q'$ or $p$) the front surfaces of the sockets of the hose are pressed firmly together so that the tightening rings ($v$) yielding in the direction of the movement are tightly pressed one against the other. In a terminal position, the hooks $p$, as soon as the swelling parts of the engaging surfaces sliding one upon the other are passed, will rest in the recesses or notches between the lugs $q$, $q'$, whereupon the locking of the coupling is complete. The respective terminal position of the hook $p$ at the side of the lug $q$ is represented by dotted lines in Fig. 5.

The above described coupling device is employed with a slight modification in the hose-coupling shown in Figs. 1, 2 and 3. The engaging notch, as engaged in Fig. 3, is arranged in this case between the hooks $c'$ $c^2$ of the hooked arm marked $c$, while the engaging lugs $d$ are simple; $q^2$, $q^2$, Figs. 1 and 3, indicate stops which limit the partial turning movement whereby the two halves of the coupling belonging to each other can evidently be pressed together in the manner above described. In this case, each of the lugs $d$, would, when the parts are locked, occupy the position shown by dotted lines in Fig. 3, relatively to the respective hooked arms $c$.

The coupling parts, as shown by the section in Fig. 2 are not immediately connected with the sockets $a$ of the hose, but form portions of separate coupling-rings or muffs $b$. Each coupling-ring $b$ embraces the socket $a$ of the coupling behind a flange $a'$ thereon in such a manner that the parts are drawn in opposite directions in the coupling.

Displacement of the halves of the coupling upon the sockets of the hose to the rear is prevented by an expanding ring $i$ which is held in an annular groove in the socket and serves as a stop, behind the carrier flange $b'$ of the coupling-ring.

In the above described manner the independent turning movement of the halves $b, b$ of the coupling is rendered possible on the sockets $a, a$ of the hose, such as is suitable for comparatively thick and therefore less yielding hose, the flange $h$ consisting of india-rubber and provided on the rings $b$, can be conveniently taken hold of by the hand to effect the turning movement to the locking position.

The hose is connected with the sockets $a$ by means of band-rings or clamping devices $k$ or in any other suitable manner. The transverse section of the front edge of each (metallic) socket $a$ is shown in Fig. 4, and upon this front edge, which is provided with an annular groove $e$, is placed the india-rubber packing-ring $f$ shaped in transverse section as shown in Fig. 4, so that an inwardly projecting part of the same engages, after the manner of a hook, with an outer groove in the body of the socket, Fig. 2. A lower projecting part $f'$ on the inner surface of the india-rubber ring $f$ fits into the annular groove $e$ which is thereby partly filled up. Into the annular chamber which is thus formed by this groove $e$, lead several channels $g$ extending from the interior of the pipe, so that the fluid under pressure can pass from the hose behind the ring $f$ and exert a pressure for the re-tightening, which is supplemental to the pressure for the tightening effected in the above described manner by the coupling device. Therefore the stronger the pressure of the fluid passing through the hose-coupling, the more secure is the joint between the adjoining india-rubber rings $f$.

Among the advantages of the above described hose-coupling device with the coupling hooks turned inwardly and the engaging lugs, as compared with other couplings to be similarly locked by a partial turning movement, may be mentioned that the working parts are readily accessible for cleaning purposes, and that no spaces are produced in which dust and dirt might collect.

As the upwardly turned lugs do not require a special projecting carrier flange to be provided on the outside, the outer periphery of the coupling will be comparatively small, while the projecting carrier arms $c$ Fig. 3, of the hooks can be given a sufficient thickness.

Having now particularly described and ascertained the nature of my said invention and the manner in which the same is to be performed, I declare that what I claim, and wish to secure by Letters Patent, is—

In combination, the two coupling members each having a groove in its end and a groove in its side, the packing rings of right angular shape in cross section each arm or side of which has a rib to fit into the end and side ribs of the coupling members, said members having openings to direct the water to the end grooves and means for locking the members together.

In witness whereof I have hereunto signed my name in the presence of two subscribing witnesses.

GERHARD TERLINDEN.

Witnesses:
 ARTHUR BAERMANN,
 W. HANT.